US012705511B2

(12) United States Patent
Calinescu et al.

(10) Patent No.: US 12,705,511 B2
(45) Date of Patent: Aug. 11, 2026

(54) AUTOMATED TAXONOMY CLASSIFICATION SYSTEM

(71) Applicant: DATA.AI INC., San Francisco, CA (US)

(72) Inventors: Melania Calinescu, San Francisco, CA (US); Xuexin Ren, Millbrae, CA (US); Han Liu, South San Francisco, CA (US)

(73) Assignee: Data.ai Inc., San Francisco, CA (US)

( * ) Notice: Subject to any disclaimer, the term of this patent is extended or adjusted under 35 U.S.C. 154(b) by 1200 days.

(21) Appl. No.: 17/006,673

(22) Filed: Aug. 28, 2020

(65) Prior Publication Data

US 2022/0067545 A1 Mar. 3, 2022

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS 8,452,778 B1 5/2013 Song et al.
2003/0217335 A1 11/2003 Chung et al.
2006/0031217 A1 2/2006 Smith et al.
2011/0320454 A1 12/2011 Hill et al.
2013/0268485 A1* 10/2013 Cao ..................... G06F 16/9538 707/722
2017/0249387 A1 8/2017 Hatami-Hanza
2021/0406601 A1* 12/2021 Narlikar .................. G06F 16/45
2022/0019858 A1* 1/2022 Hyland ................... G06F 18/41
2022/0101127 A1* 3/2022 Torras ................. G06V 10/774

OTHER PUBLICATIONS

Polikar, R et al., "Learn++.MF: A random subspace approach for the missing feature problem," Pattern Recognition vol. 43 ( 2010) pp. 3817-3832. (Year: 2010).*

(Continued)

*Primary Examiner* — Brian M Smith
(74) *Attorney, Agent, or Firm* — VLP Law Group, LLP

(57) ABSTRACT

A taxonomy classification system assigns taxonomy labels to content items of an online system. To assign the taxonomy labels, the taxonomy classification system applies one or more taxonomy model to the content items to determine scores or probabilities that a particular label applies to the content item. Each taxonomy model includes multiple sub-models. Each sub-model corresponds to a different type of information for the content item. For example, a first sub-model corresponds to a description of the content item, a second sub-model corresponds to metrics of the content item in one or more content item publishers, a third sub-model corresponds to similar content items to the content item being evaluated. The taxonomy classification system combines the output from every sub-model to determine a label score for one or more labels in a label class and a taxonomy label from the label class is selected based on the determined label score.

14 Claims, 13 Drawing Sheets

(56) References Cited

OTHER PUBLICATIONS

Sharpe, P. K. et al., "Dealing with missing values in neural network-based diagnostic systems," Neural Comput. & Applic. No. 3 (1995) pp. 73-77. (Year: 1995).*
Saar-Tsechansky, M. et al., "Handling missing values when applying classification models," Journal of Machine Learning Research, vol. 8 (2007) pp. 1625-1657. (Year: 2007).*
International Search Report and Written Opinion, Patent Cooperation Treaty Application No. PCT/US2021/047401, Dec. 1, 2021, 13 pages.

* cited by examiner

AUTOMATED TAXONOMY CLASSIFICATION SYSTEM

BACKGROUND

This disclosure relates generally to automatically classifying content items based on a set taxonomy.

Content publishers oftentimes apply labels to content items to guide users filtering the vast amount of content that can be access through their systems. Users can quickly skim through labels to and focus their attention on content items that include labels that the users think will interest them. However, labels are not consistent across content publishers, even if two or more content publishers are offering the same content items. As such, users may end up getting confused by the labels and they may end up missing out on content items that would have been interesting to them but for the improper label being applied. Moreover, labels applied by content publishers may be broad and they can sometimes conflate substantially different content items into the same category.

SUMMARY

A taxonomy classification system assigns taxonomy labels to content items of an online system. The taxonomy classification system assigns one or more taxonomy labels to a content item. To assign the taxonomy labels, the taxonomy classification system applies one or more taxonomy model to the content items to determine scores or probabilities that a particular label applies to the content item.

Each taxonomy model includes multiple sub-models. Each sub-model corresponds to a different type of information for the content item. For example, a first sub-model corresponds to a description of the content item, a second sub-model corresponds to metrics of the content item in one or more content item publishers, a third sub-model corresponds to similar content items to the content item being evaluated. The taxonomy classification system combines the output from every sub-model to determine a label score for one or more labels in a label class and a taxonomy label from the label class is selected based on the determined label score.

Sub-models may have multiple versions, each trained using a different combination of features of content items in a training dataset. For example, a metrics model may have multiple version, each trained using a different combination of metrics information. The taxonomy classification system selects a version of the sub-model based on the available features for the content item.

In some embodiments, the taxonomy has multiple level (e.g., forming a hierarchical or tree structure). In this embodiment, the taxonomy classification system assigns a first-level taxonomy label corresponding to a first level of a taxonomy. The first-level taxonomy label is selected using a first trained taxonomy model. The taxonomy classification system selects a second-level taxonomy model from a set of second-level taxonomy models. The second-level taxonomy model is selected based on the selected first-level taxonomy label. Using the selected second-level taxonomy model, a second-level taxonomy label is assigned to the content item. The second-level taxonomy label corresponding to a second level of the taxonomy.

The taxonomy classification system additionally assigns one or more tags to the content item. The tags are assigned by applying models for determining a likelihood that a tag applies to the content item. Each model corresponds to a tag. If the likelihood that a tag applies to the content item is above a threshold value, the tag is assigned to the content item.

In some embodiments, a determination of whether to assign a taxonomy label to a content item is made by determining a confidence score. A taxonomy label from a label class is assigned to a content item if the determined confidence score is higher than a threshold value. The confidence score is determined by determining selection scores for each taxonomy label in the label class. The taxonomy classification system identifies a taxonomy label with a highest selection score, and a taxonomy label with a second highest taxonomy score. The taxonomy classification system then determines a pre-confidence score based on a difference between the highest selection score and the second highest selection score. The taxonomy classification system determines the confidence score based on the pre-confidence score. The confidence score is determined using estimated parameters calculated by fitting a probability curve to a training dataset.

In some embodiments, if the confidence score is above a threshold value, the taxonomy classification system selects the taxonomy label with the highest selection score. Otherwise, if the confidence score is below the threshold value, the content item is sent for manual classification.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1A:
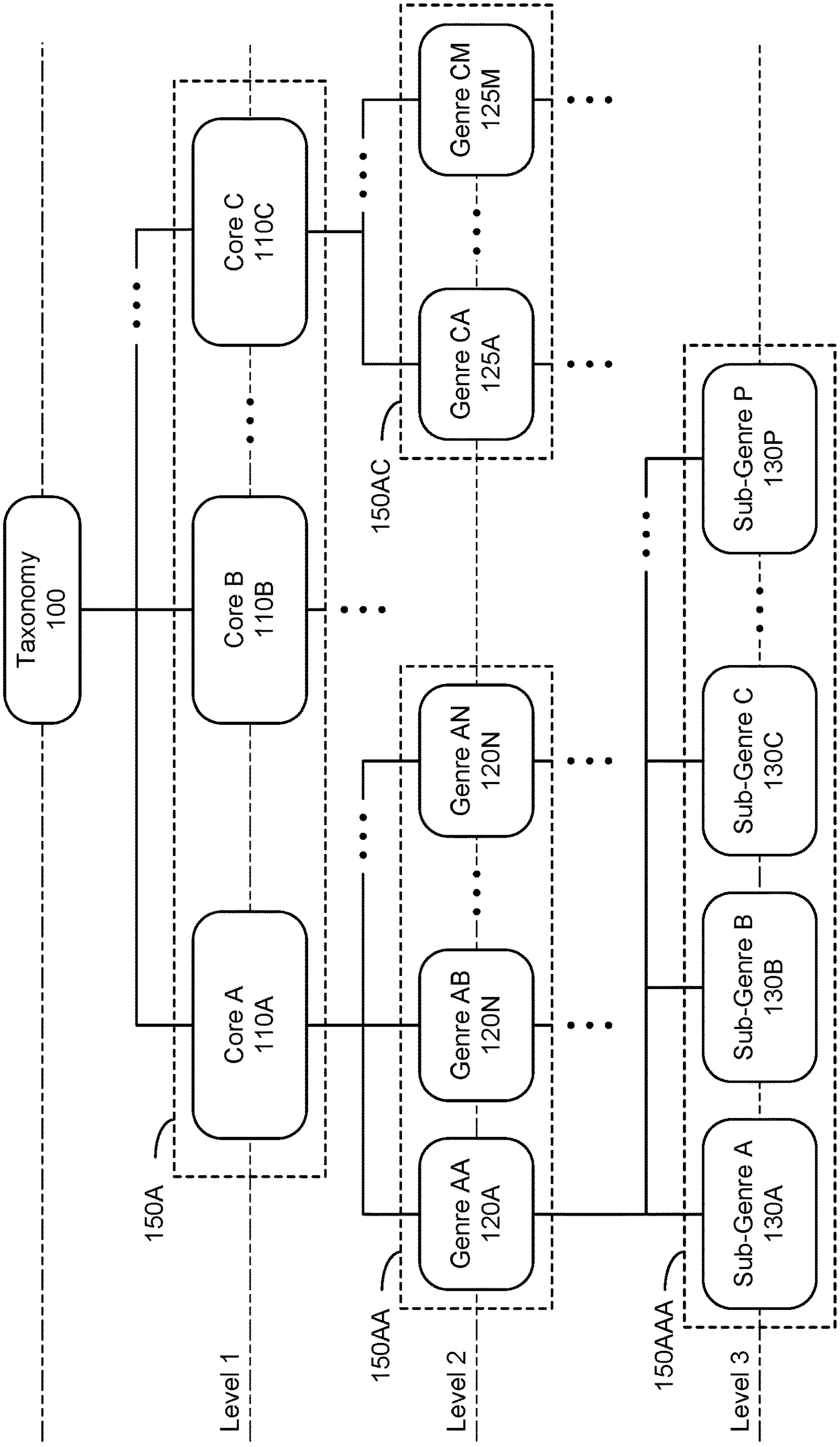
FIG. 1A illustrates an example taxonomy for classifying content items, according to one embodiment.

FIG. 1A illustrates an example taxonomy for classifying content items, according to one embodiment. In some embodiments, the taxonomy has a hierarchical structure. For example, the taxonomy shown in FIG. 1A is organized as a tree, where a parent label at one level has one or more child labels at a level below. In this configuration, every child label of a particular parent label is part of a label class.

The taxonomy 100 shown in FIG. 1A has multiple levels. The example taxonomy 100 of FIG. 1A has three levels (level 1 through level 3). Each level includes one or more classes 150, and each class includes one or more labels that can be assigned to the content item. In particular, each level has as many classes as the number of labels in the level above it. That is, the second level has as many classes 150 as the number of labels 110 in the first level, the third level has as many classes 150 as the number of labels 120, 125 in the second level.

The taxonomy 100 has a single class 150A in the first level. The first-level class 150A has multiple labels 110A through 110C that can be assigned to a content item. Once a first-level label from the first-level class is selected, the second level labels that can be selected for the content item are restricted to a second-level class that is associated with the selected first-level label. That is, if the core A label 110A is selected, the available second-level labels 120 are restricted to the second-level class 150AA associated with the core A label 110A. Similarly, if the core C label 110C is selected, the second-level labels 125 are restricted to the second-level class 150AC associated with the core C label 110C.

Moreover, once a second-level label is selected from the second-level class, the third-level labels that can be selected for the content item are restricted to a third-level class that is associated with the selected second-level label. This process is then repeated until a label from every label is selected for the content item.

Figure 1B:
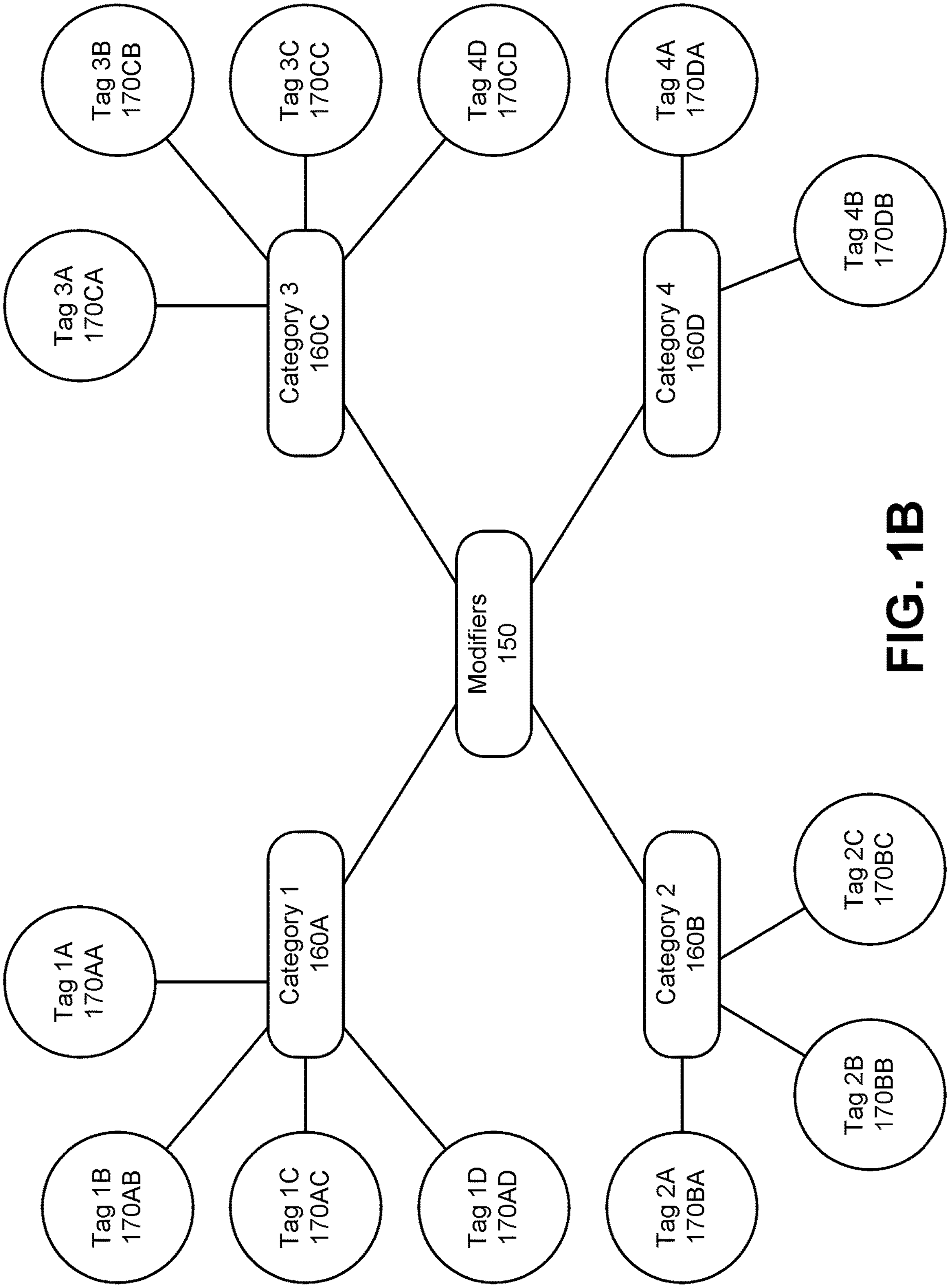
FIG. 1B illustrates an example set of modifiers that can be applied to content items to augment the taxonomy classification shown in FIG. 1A, according to one embodiment.

FIG. 1B illustrates an example set of modifiers that can be applied to content items to augment the taxonomy classification shown in FIG. 1A, according to one embodiment. The modifiers are groups in one or more categories 160. In the example of FIG. 1B, the set of modifiers are groups in four categories 160A through 160D. For example, the modifiers for applying to mobile games may be grouped into categories such as "gameplay features," "monetization," "visual," and "thematic." Each group then includes one or more tags 170 that can be associated with a content time. For instance, the "gameplay features" group may include tags such as "AR," "achievements," "chat," "competitive multiplayer," "leaderboards," "MMO," "guilds, clan, clubs," "daily & login rewards," "events," "lucky spin/scratch card," "friend invites," "tournament," 'customization," "auto battle," and "social assist." The "monetization" group may include tags such as "advertising," "power ups," "starter pack," "cosmetic items," "subscription," "VIP," "battle pass," gacha/ loot box," "ad removal," and "consumables." The "visual" group may include tags such as "orientation," "2D," "3D," and "art style."

Unlike taxonomy labels, which only one label is associated with the content item for each level of the taxonomy, any number of modifiers from any number of groups may be associated with the content item. In some embodiments, the determination of whether a tag applies to a content item is different depending on the group 160 the tag belongs to. For example, the process for determining whether a visual tag applies to a content item is different from a process for determining whether a monetization tag applies to the content item. Detail descriptions of processes for determining whether different types of modifier tags apply to a content item are provided below in conjunction with FIGS. 9 and 10.

System Architecture

Figure 2:
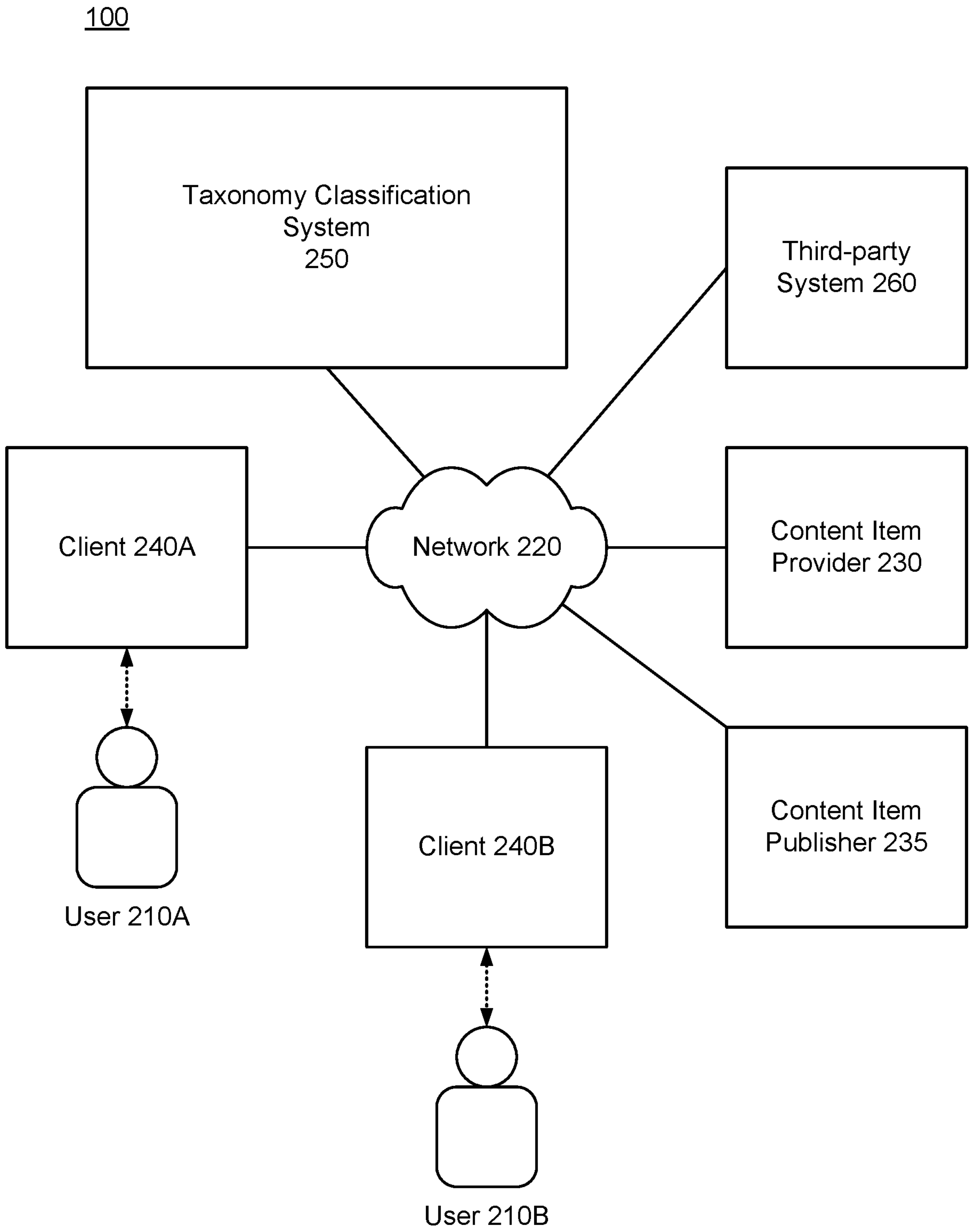
FIG. 2 is a block diagram of a system environment for content classification system.

FIG. 2 is a block diagram of a system environment 200 for content classification system 250. The system environment 200 shown by FIG. 2 includes one or more client devices 240, a network 220, one or content item providers 230, one or more content item publishers 235, one or more third-party systems 260, and the taxonomy classification system 250. In alternative configurations, different and/or additional components may be included in the system environment 200. Moreover, in alternative configurations, one or more systems may be combined into a single entity, or may be provided by a single entity. For example, the content item publisher 235 can be combined with the taxonomy classification system 250 to form a single system that both classifies content items and provides access to the content items to users of the content item publisher.

The client devices 240 are one or more computing devices capable of receiving user input as well as transmitting and/or receiving data via the network 220. In one embodiment, a client device 240 is a conventional computer system, such as a desktop or a laptop computer. Alternatively, a client device 240 may be a device having computer functionality, such as a personal digital assistant (PDA), a mobile telephone, a smartphone, or another suitable device. A client device 240 is configured to communicate via the network 220. In one embodiment, a client device 240 executes an application allowing a user of the client device 240 to interact with the content item publisher 235. For example, a client device 240 executes a browser application to enable interaction between the client device 240 and the content item publisher 235 via the network 220. In another embodiment, a client device 240 interacts with the content item publisher 235 through an application programming interface (API) running on a native operating system of the client device 240, such as IOS® or ANDROID™.

The client devices 240 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

The content item provider 230 provides content item to the content item publisher 235 for distribution to client devices 240. The content item provider 230 additionally provides information related to the content items to inform the users and guide the users in choosing what content items to consume. For example, a content item provided by a content item provider 230 is a mobile game to be played by a user 210 through a client device 240. The game is distributed through app stores acting as content item publishers 235. The information associated with the mobile game includes a description about the gameplay and features of the game to persuade users to download and play the mobile game.

In some embodiments, the content item publishers 235 additionally generate information such as metrics information related to the performance of the content item in the publisher, and affinity information related to other content items that users commonly consume when in addition to a particular content item.

The system environment may additionally include third-party systems 260. For example, third-party systems may provide additional information regarding the content items that are being distributed by the content item publisher 235. For instance, a third-party system 260 may be a review site that provides an independent review and commentary about the content items.

The taxonomy classification system 250 classifies the content items and assigns one or more tags or labels to help users in choosing whether to consume the content item. In some embodiments, the taxonomy classification system 250 receives information from the content item publishers 235, the content item providers 230, or other third-party systems such as systems providing reviews of various content items, to classify the content items. Moreover, the taxonomy classification system 250 may generate additional information for the content items, such as proprietary metrics information, based on information received from the various systems in communication with the taxonomy classification system 250.

Figure 3:
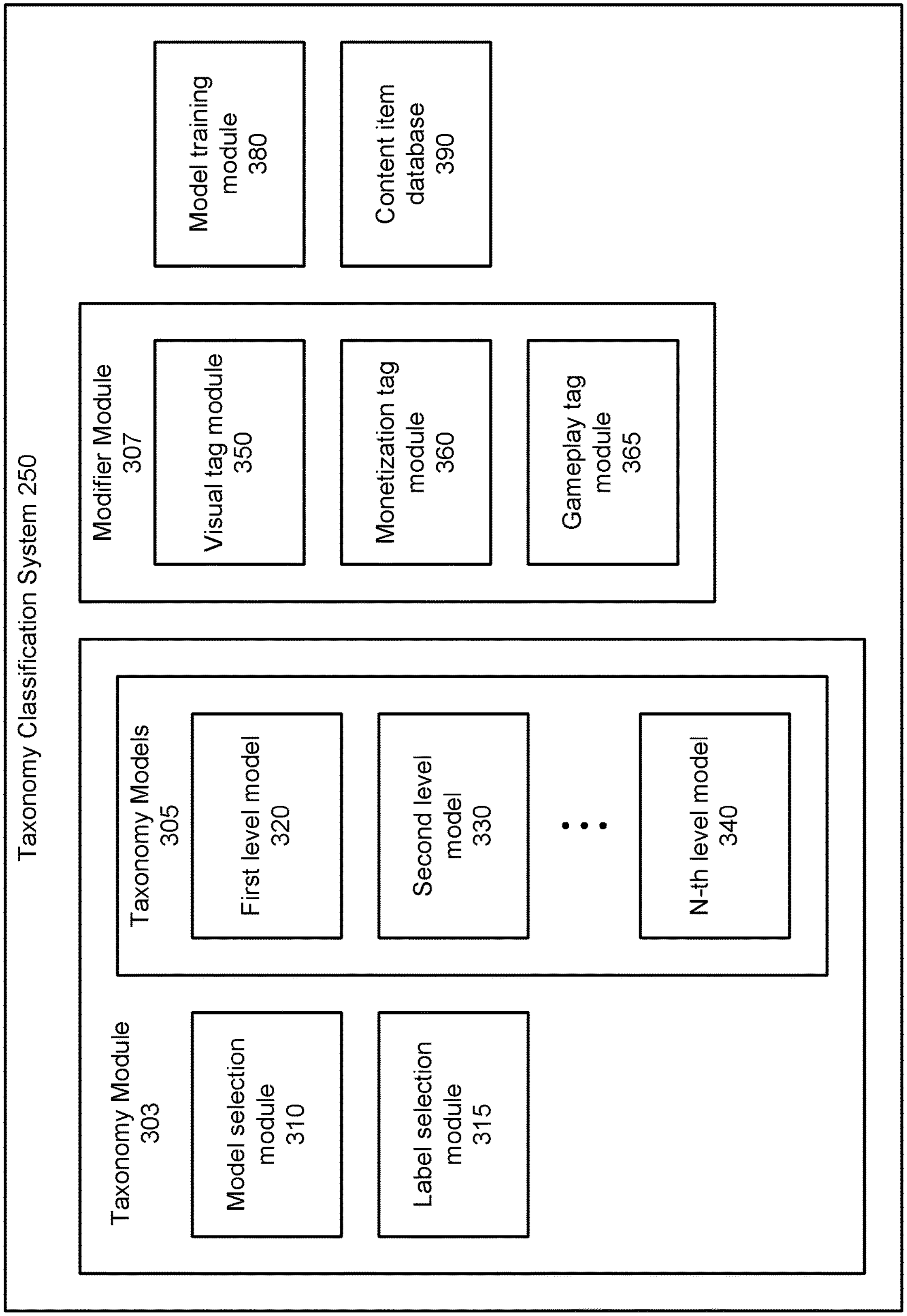
FIG. 3 is a block diagram of an architecture of the taxonomy classification system.

FIG. 3 is a block diagram of an architecture of the taxonomy classification system 250. The taxonomy classification system 250 shown in FIG. 3 includes a taxonomy module 303, a modifier module 307, and a model training module 380, and a content item store 390. In other embodiments, the taxonomy classification system 250 may include additional, fewer, or different components for various applications. Conventional components such as network interfaces, security functions, load balancers, failover servers, management and network operations consoles, and the like are not shown so as to not obscure the details of the system architecture.

The taxonomy classification system 250 applies one or more models to classify the content items and to assign the one or more tags. In some embodiments, the taxonomy classification system 250 reapplies the one or more model periodically to reclassify the content item and reapply the one or more tags. For example, the taxonomy classification system 250 reapplies the one or more models to a content item every 6-months or every year to determine if the content item's classification has changed or if any of the tags should be removed or added. That is, if the content item changes or evolves in between two times the one or more models are applied, when the classification system 250 reapplies the one or more models, the classification system is able to obtain the updated information about the content item and applies the one or more models on the updated set of information.

In other embodiments, the taxonomy classification system 250 reapplies the one or more models when a particular event occurs. For example, the taxonomy classification system 250 reapplies the one or more models when a major update for the content item is available in a content item publisher. Major updates to the content item may signify that certain aspects of the content item have changed and that a previous classification may be obsolete. As such, when the taxonomy classification system 250 receives a indication that the content item has been updated, the taxonomy classification system 250 retrieves the information about the updated content item, or information regarding the update of the content item and reapplies the one or more models based on the newly acquired information for the content item.

As such, the models used by the taxonomy classification system 250 are not deterministic for a particular content item, but the outcome of the models may change if certain aspects of content item changes. That is, even when a model has not been retrained in between applications, when the model is applied to the same content item, if the content item has changed in between applications, the model may provide different outcomes for the content item before and after the change occurred.

Moreover, even if the app has not changed in between two applications of the model, the taxonomy classification system 250 may be able to gather additional information in between the two applications of the model. For example, after a 6-month period, the taxonomy classification system 250 is able to acquire additional metrics information (e.g., number of downloads of the content item, total revenue of the content item, etc.). When the taxonomy classification system 250 applies the model a second time with the additional information that was able to gather, the outcome of the model may change from the first time the model was applied to the content item.

The content item database 390 stores information related to content items distributed by one or more content item publishers 235. The information stored in the content item database 390 may be received from the content item provider 230, the content item publisher 235, or might be generated by the taxonomy classification system 250. Information related to content items stored by the content item database 390 includes a description of the content items, metrics information about the performance of the content items in various content item publishers 235, affinity information indicating similar content items, and taxonomy information determined by the taxonomy classification system 250.

The taxonomy module 303 applies taxonomy models 305 to assign taxonomy labels to content items. The taxonomy module 303 includes a taxonomy model 305 for each taxonomy class 150 of the taxonomy 100. Each taxonomy model 305 determines label scores for each taxonomy label in its corresponding taxonomy class 150. In some embodiments, the label scores determined by the taxonomy models 305 are a probability (e.g., from 0 to 1) that a particular label applies to a content item. In one embodiment, the label scores of each of the labels in a single label class add up to 1. In other embodiment, the label scores determined by the taxonomy models 305 are scores in other scales (e.g., from 0 to 100). In some embodiments, the label scores for each of the labels in a label class are independent from each other. Moreover, the taxonomy models 305 are grouped by taxonomy levels. That is, the taxonomy module 303 includes one first-level model 320, multiple second level models 330, and multiple n-th level models 340. Each taxonomy model 305 is trained using a using a training dataset that includes content items that were assigned labels in their corresponding taxonomy class. That is, a first second-level model 330A is trained using content items associated with labels included in a first second-level class (i.e., content items associated with a first first-level label), and a second second-level model 330B is trained using content items associated with labels included in a second second-level class (i.e., content items associated with a second first-level label).

The model selection module 310 selects a version of a model to be applied to a content item based on the types of information available for the content item. Certain models of the taxonomy module 303 have several versions, each trained with a different combination of information categories. The different versions of the model are then applied by providing the models inputs corresponding to the information categories used to train them. Moreover, each version of the model has a different priority value based on the types of information categories that the model receives as input.

The model selection module 310 identifies the information categories that are available for a content item and identifies whether the information categories that are available for the content item include information categories for every category that a version of the model takes as input. The model selection module 310 filters the versions of the model based on the determination and selects the version of the model with the highest priority value. A detailed description of a process for selecting a version of a model is provided below in conjunction with FIG. 7

The label selection module 315 receives label scores for one or more labels in a label class from a taxonomy model and determines if a label from the label class should be assigned to the content item. The label selection module 315 calculates a confidence score by comparing the label scores for each of the labels in the label class and determines whether label scores determined by the taxonomy model provide enough confidence in the selection of the label to assign to the content item. In some embodiments, the confidence score is determined based on a comparison between the label score for the highest scored label and the label score for the second highest scored label. A detailed description of a process for determining whether to assign a taxonomy label based on label scores determined by a taxonomy model is provided below in conjunction with FIGS. 8A and 8B.

The modifier module 307 selects one or more modifier tags to be associated with a content item by applying corresponding modifier models. The modifier module 307 includes multiple modules corresponding to different categories of modifiers. For example, the modifier module 307 includes a visual tag module 350 for determining whether to associate visual tags with the content item, a monetization tag module 360 for determining whether to associates monetization tags with the content item, or a gameplay tag to determine whether to associate gameplay tags with the content item. A detailed description of a process for selecting a visual tag for a content item is provided in conjunction with FIG. 9. A detailed description of a process for selecting a monetization or a gameplay tag for a content item is provided in conjunction with FIGS. 10A-B.

Each module includes a model corresponding to each tag in the corresponding category. For instance, the visual tag module includes a model for each visual tag, the monetization tag module includes a model for each monetization tag, and the gameplay module include a model for each gameplay tag. Each module applies each of the models to the content item and determines whether any of the tags assign to the content item.

The model training module 380 applies machine learning techniques to generate each of the trained models in the taxonomy classification system 250. For example, the model training module 380 applies machine learning techniques to generate each of the taxonomy models and each of the modifier models. Each model is independently trained based on a different set of features or information for content items in a training dataset. In some embodiments, each model has its own training dataset.

In some embodiments, models include multiple version, each trained using a different set of features or feature categories, the training module 380 trains each of the versions independently based on their corresponding feature categories. For example, the features used by a model may be categorized into a set of categories. Each version of the model can then be trained using a different subset of feature categories. Moreover, the training module 380 may train one version of the model that uses every feature category available for the model. By training multiple versions of the same model, each version can be optimized to improve the accuracy of the version of the model based on the subset of feature categories assigned to the version of the model.

Taxonomy Classification Algorithm

Figure 4:
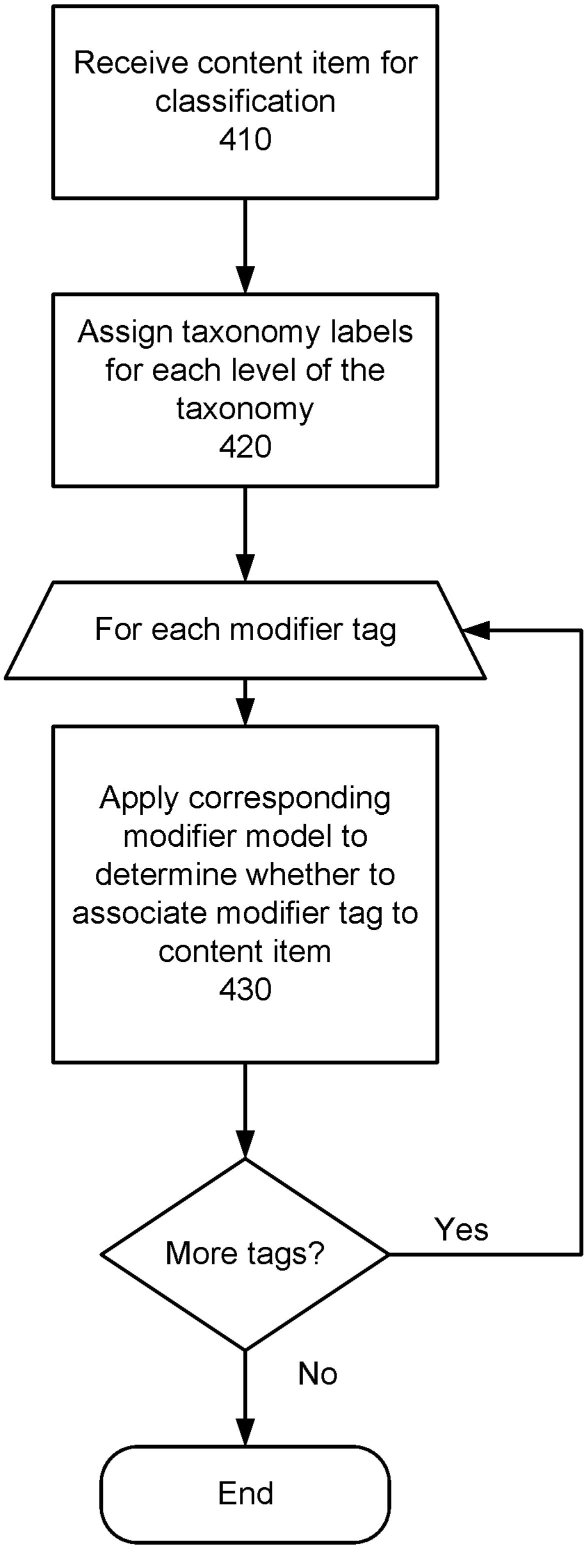
FIG. 4 illustrates a flow diagram for classifying a content item, according to one embodiment.

FIG. 4 illustrates a flow diagram for classifying a content item, according to one embodiment. The taxonomy classification system 250 receives 410 a content item and information associated with the content item. The information associated with the content item may be received from the content item provider 230 and third-party systems. For example, information associated with the content item may be received from content item publishers 235 that distribute the content item to client devices of users.

The taxonomy module 303 applies the taxonomy models 305 to assign 420 taxonomy labels to the content item for each level of the taxonomy. The taxonomy module 303 applies a first-level model 320 to assign a first-level label to the content item. The taxonomy module 303 applies a second-level model 330 to assign a second-level label to the content item. The taxonomy module 303 repeats this process for each level of the taxonomy. A process for assigning taxonomy labels to a content item is described below in conjunction with FIG. 5.

For each modifier tag available, the modifier module 307 applies 430 a corresponding modifier model to determine whether to associate the modifier tag to the content item. The modifier module 307 applies a different modifier model for each modifier tag. Each modifier model is specifically trained to determine whether its corresponding modifier tag should be associated with the content item. In some embodiments, each modifier model generates a modifier score indicative of a likelihood that the corresponding tag applies. The modifier module 307 then assigns the modifier tag to the content item if the modifier score for the modifier tag is higher than a threshold value. In other embodiments, each modifier model outputs a Boolean value indicating whether a corresponding modifier tag should be associated with the content item.

Figure 5:
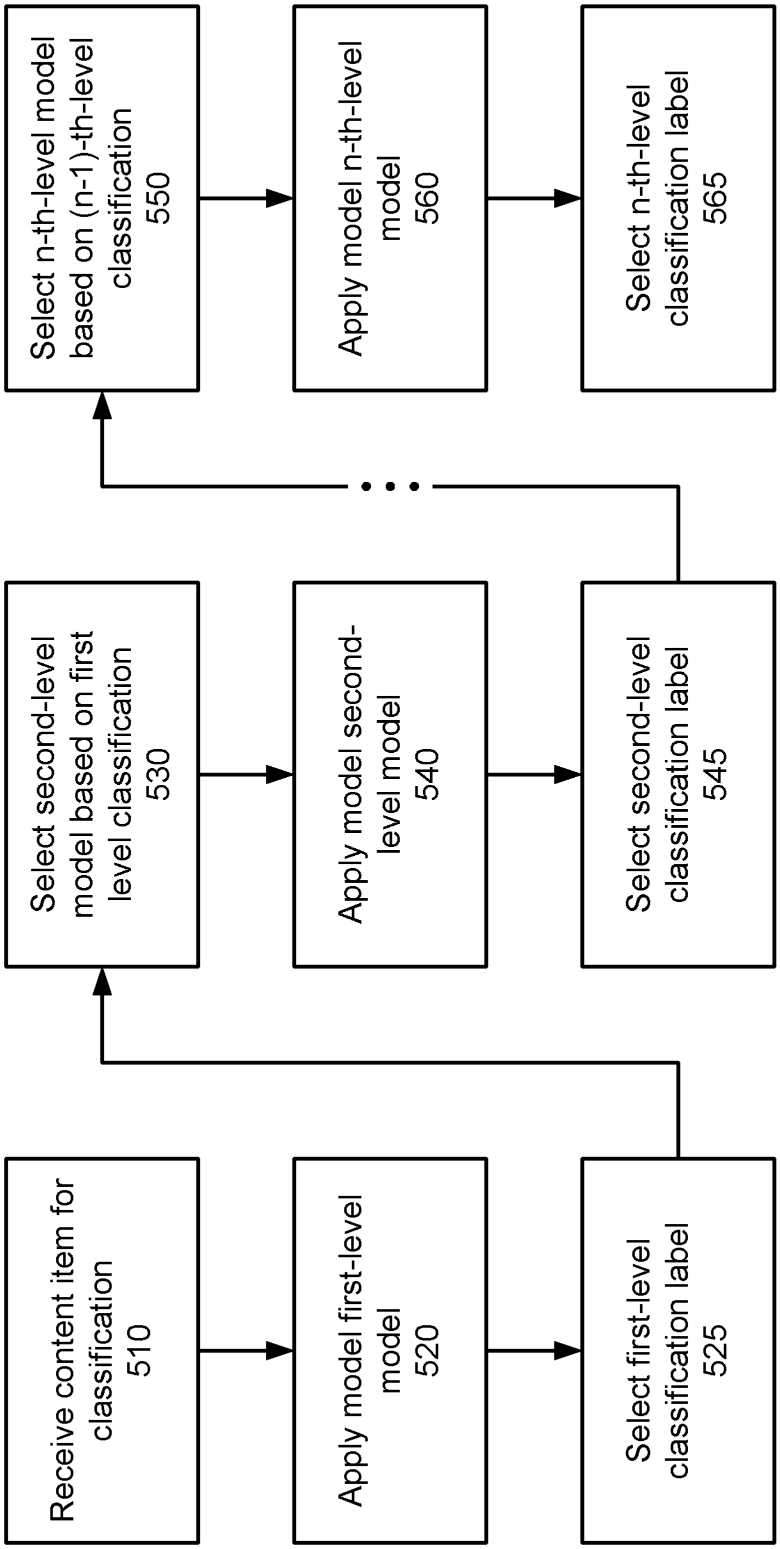
FIG. 5 illustrates a flow diagram for assigning taxonomy labels to a content item, according to one embodiment.

FIG. 5 illustrates a flow diagram for assigning taxonomy labels to a content item, according to one embodiment. The taxonomy module 303 receives 510 information associated with the content item to assign taxonomy labels. The taxonomy module 303 applies 520 a first-level model 320. The process for applying a model is provided in more detail in conjunction with FIG. 6. The first-level model 320 determines label scores for one or more first-level labels 110 in a first-level class 150A. In some embodiments, the first-level model determines a label score for each first-level label 110 in the first level class 150A. That is, the first-level model 320 determines a first label score for core A label 110A, a second label score for core B label 110B, and a third label score for core C label 110C.

Based on the determined label scores, the label selection module 315 selects 525 a first-level label 110 to be associated with the content item. In some embodiments, the label scores are used to determine if there is a sufficient confidence level for a particular label. If there is a sufficient confidence level (e.g., the confidence level is above a threshold value), the first-level label with the highest score is selected and assigned to the content item. However, if the confidence level is below a threshold value, the content item may be sent for manual review. The process for assigning a label to a content item is described in more detail in conjunction with FIG. 8A.

Based on the selected first-level label 110, the taxonomy module 303 selects 530 a second-level model 330. In some embodiments, the taxonomy classification system 250 has a different second-level model 330 for each first-level model. For example, for the example taxonomy of FIG. 1A, the taxonomy classification system 250 includes a first second-level model 330A for core A label 110A, a second second-level model 330B for core B label 110B, a third second-level model 330C for core C label 110C. The taxonomy module 303 selects the second-level model associated with the selected first level label. For example, if the label selection module 315 selects core A label 110A to be associated with the content item, the taxonomy module 303 selects the first second-level model 330A to select a second-level label. If the label selection module 315 selects core B label 110B to be associated with the content item, the taxonomy module 303 selects the second second-level model 330B to select a second-level label. If the label selection module 315 selects core C label 110C to be associated with the content item, the taxonomy module 303 selects the third second-level model 330C to select a second-level label.

Each second-level model 330 is trained to generate a label score for one or more labels in a corresponding second-level class 150A through 150C. That is, the first second-level model 330A associated with core A label 110A is configured to generate label scores for the labels in the first second-level class 150AA associated with the core A label 110A. The second second-level model 330B associated with core B label 110B is configured to generate label scores for the labels in the second second-level class 150AB associated with the core B label 110B. The third second-level model 330C associated with core C label 110C is configured to generate label scores for the labels in the third second-level class 150AC associated with the core C label 110C.

The taxonomy module 303 applies 540 the selected second-level model 330. The second-level model 330 determines label scores for one or more second-level labels 120, 125 in a second-level class associated with the selected first-level label. In particular, the second-level model 330 is configured to determines label scores for one or more second-level labels 120, 125 that are under the selected first-level label 110. For example, if a first first-level label 110A (Core A) is selected, the first second-level model 330A determines label scores for one or more second-level labels 120A through 120N (Genre AA through Genre AN) that are under the first first-level label 110A in the taxonomy. Conversely, if a third first-level label 110C (Core C) is selected, the third second-level model 330C determines label scores for one or more second-level labels 125A through 125M (Genre CA through Genre CM) that are under the third first-level label 110C in the taxonomy.

Based on the determined label scores, the label selection module 315 selects 545 a second-level label 120, 125 to be associated with the content item. The taxonomy module 303 selects one of the second-level labels 120A, 125 that are under the selected first-level label 110. That is, if core A 110A was selected as the first-level label, one of genre AA 120A through genre AN 120N is selected as the second-level label. If core C 110C is selected as the first-level label, one of genre CA 125A through genre CM 125M is selected as the second-level label.

This process continues until an n-th-level label is selected for the content item. That is, after then (n−1)-th-level label has been selected, the taxonomy module 303 selects 550 an n-th-level model. For instance, if the taxonomy has three level, after the second-level label has been selected, the taxonomy module 303 selects 550 a third-level model 140 based on the selected second-level label. The taxonomy module 303 then applies 560 the selected n-th-level model, and selects 565 an n-th-level label for the content item. For instance, if the taxonomy has three levels and the genre AA 120A label was selected for the content item, the selected third-level model 140A determines label scores for one or more third-level labels 130A through 130P under that selected second-level label 120A, and one third-level label 130 is selected based on the determined label scores.

Figure 6:
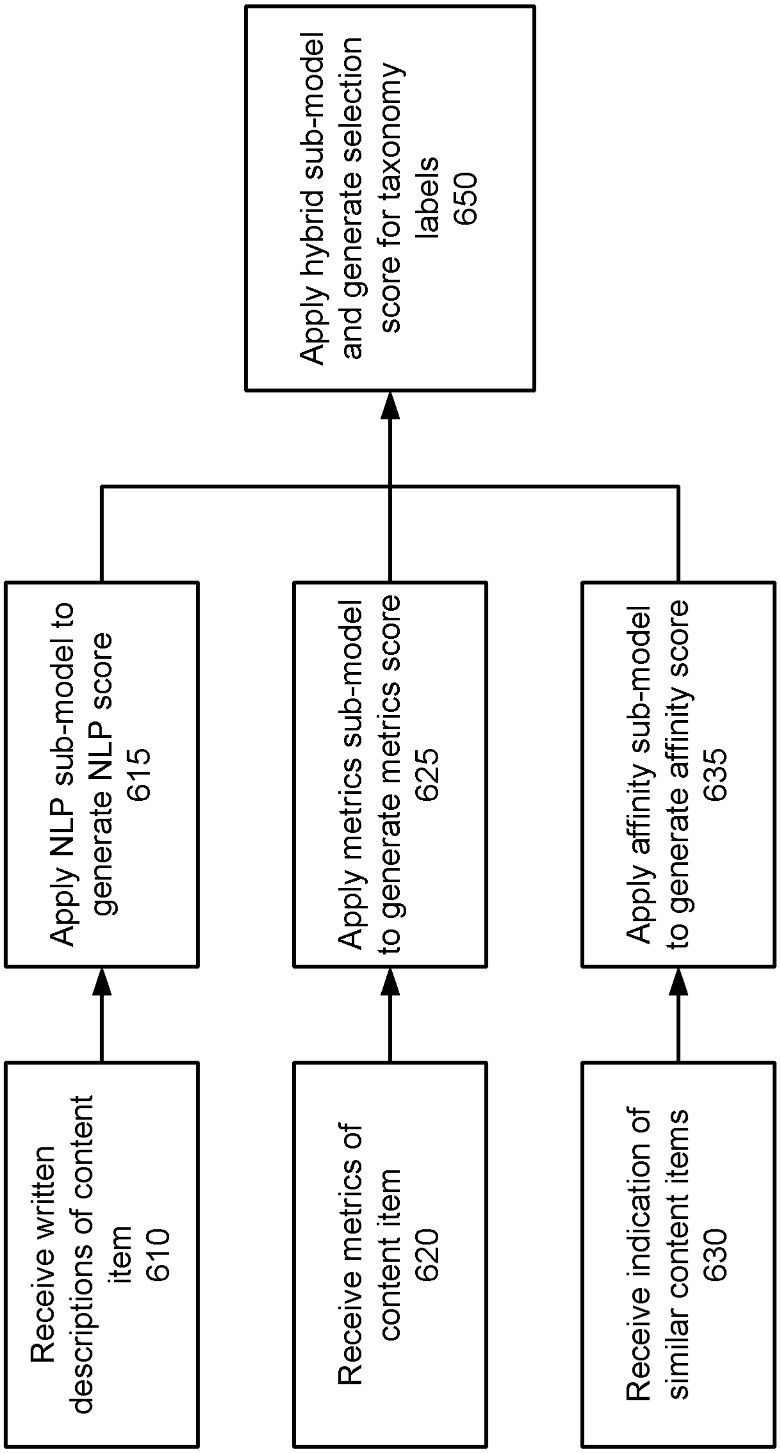
FIG. 6 illustrates a flow diagram for applying a model to determine label scores for taxonomy labels, according to one embodiment.

FIG. 6 illustrates a flow diagram for applying a model to determine label scores for taxonomy labels, according to one embodiment. The model applied in FIG. 6 may be a model at any level of the taxonomy. Each model (i.e., each first-level model, each second-level model, . . . , and each n-th level model) includes multiple sub-models that are combined using a hybrid sub-model. In the example of FIG. 6, each model includes a natural language processing (NLP) sub-model, a metrics sub-model, and an affinity sub-model.

The NLP sub-model receives 610 written descriptions of the content item. The written descriptions may be received from the content item provider 230 or the content item publisher 235. The written descriptions include text that describes characteristics of the content item to users of a content item publisher 235.

In some embodiments, the written description of the content item is pre-processed before provided to the NLP sub-model. For example, the written description is translated to a predetermined language. For instance, if a non-English written description is received, the non-English written description may be translated to English before being provided to the NLP sub-model. Moreover, if multiple written descriptions from multiple sources is received for the same content item, the multiple written descriptions are concatenated to obtain a unified written description of the content item. In some embodiments, the multiple written descriptions include written descriptions for different versions of the same content item, or for different descriptions provided by different content item publishers 235 that distribute the content item. In some embodiments, the written descriptions are standardized (e.g., by removing html or xml tags, or by replacing special characters), lemmatized, or modified to remove stop words before being provided to the NLP sub-model.

Based on the received written description of the content items, the NLP sub-model is applied 615 to generate an NLP score for the content item. The NLP sub-model may generate an NLP score $prob_{NLP}(label_i)$ for each label $label_i$ in a corresponding label class 150. For example, if the model being applied corresponds to class 150A, the NLP sub-model generates NLP scores for every label 110A through 110C in class 150A. In some embodiments, the NLP scores for each of the labels add up to a predetermined number. For example, the NLP scores for each of the labels add up to 1. In other embodiments, each label receives an independent NLP score.

The metrics sub-model receives 620 metrics of the content item from one or more sources. The metrics may be received from one or more content item publishers 235. The metrics used by the metrics sub-model correspond to the performance of the content item in the one or more content item publishers 235. Metrics may include a number of downloads of the content item, a reach of the content item, an install based on the content item, a revenue of the content item, number of paid downloads, number of organic downloads, proportion of paid and organic downloads, number of active users, engagement of the active users (e.g., number of sessions and session duration), and the like.

In some embodiments, if the content item has multiple version, the metrics received from a source are unified before being provided to the metrics sub-model. For example, a content item may include a free version and a premium version. In another example, the content item may include a full version and a trial version. In some embodiment, the metrics of a single version is selected if the content item has multiple version. For example, the version with the highest revenue, or the version with the highest number of downloads is be selected and the metrics for the selected version is provided to the metrics sub-model. In another embodiment, the metrics from every version is combined to generate combined metric.

In some embodiments, the metrics receives from multiple sources are unified before being provided to the metrics sub-model. That is, if multiple content item publishers 235 are able to distribute the content item, each content item publisher 235 may have their own metrics about how the content item is performing in their respective platforms. The metrics from each of the sources are combined to generate combined metrics and the combined metrics are provided to the metric sub-model.

Moreover, in some embodiments, the metrics are preprocessed before being provided to the metrics sub-model. For instance, the metrics are transformed to a common scale (e.g., to a scale having a range of 0 to 1). Additionally, the metrics are power transformed to a Gaussian-like distribution.

Figure 7:
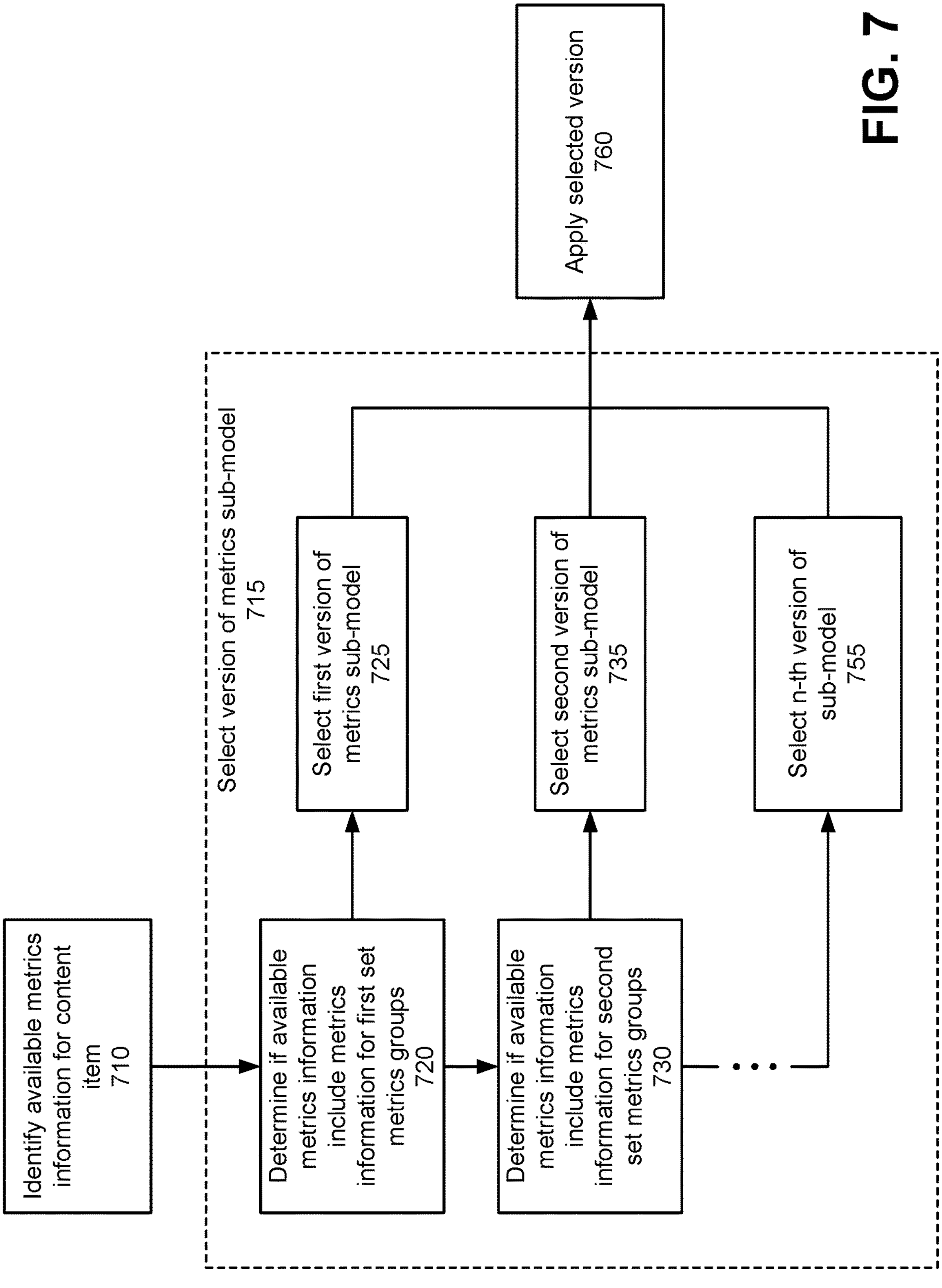
FIG. 7 illustrates a flow diagram for applying a metrics model based on metrics data for a content item, according to one embodiment.

The metrics sub-model is applied 625 to generate a metrics score for the content item. FIG. 7 illustrates a flow diagram for applying a metrics model based on metrics data for a content item, according to one embodiment.

The model selection module 310 identifies the available metrics information for the content item. In some embodiments, the metrics information for a content item is categorized in groups. The taxonomy classification system determines which groups of metrics information are available, and selects a version of the first-level model based on the groups of information that are available.

For example, a first group includes information related to a total revenue and total number of downloads or install based of a content item. A second group includes information related to a percentage of paid downloads. A third group includes information related to usage metrics (e.g., number of active users consuming the content item). A fourth group includes information related to engagement metrics (e.g., average duration of each session of the content item, average number of sessions of the content item, total amount of time spent consuming the content item, install based of the content item, and proportion of active users in total install base).

The model selection module 310 selects 715 a version of the metrics sub-model based on the available information for the content item. The taxonomy classification system 250 includes different versions of each of the metrics sub-model for different permutations of groups. For instance, the taxonomy classification system 250 includes a first version of a metrics sub-model that takes as input information corresponding to only one group (e.g., the first group). The taxonomy classification system 250 also includes versions of the metrics sub-model that takes as input information corresponding to various sub-combinations of groups. Finally, the taxonomy classification system 250 includes a version of the metrics sub-model that takes as input information corresponding to every group.

Each version of the metrics sub-model is trained using information corresponding to the groups that the sub-model takes as an input. For example, the metrics sub-model that takes as input information corresponding to only the first group is trained using information corresponding to the first group for content items in a training data set. Similarly, the metrics sub-model that takes as input information corresponding to only the first and second groups is trained using information corresponding to the first and second groups for content items in the training data set. In some embodiments, every version of a metrics sub-model is trained using the same set of content items. In this embodiment, the training dataset includes content items for which information for every group is available. In other embodiments, each metrics sub-version is trained using a different set of content items. For instance, for each content item in the training dataset, the model training module 380 determines whether the metrics information available is sufficient to be used with a specific metrics sub-model. If the metrics information available is sufficient to be used with a specific metrics sub-model, the model training module 380 adds the content item to the training dataset of the specific metrics sub-model. For example, if the metrics information available for a training content item includes metrics information corresponding to the first group, the second group, and the third group, the model training module 380 adds the training content item to the training datasets of metrics sub-model that take as inputs any combination or sub-combination of the first, second, and third groups.

Each of the versions of the metrics sub-model has a priority level. The priority level of a version of the metrics sub-model is based on the metrics information the version of the sub-model takes as input. In general, versions that take as inputs more metrics groups have a higher priority than versions that take as inputs less metric groups. In some embodiments, the version that takes as input every metrics groups has the highest priority and the version that takes as input only one metrics group has the lowest priority.

The model selection module 310 determines 720 if the metrics information available for the content item includes at least metrics information corresponding to a first set of metrics groups. The first set of metrics groups corresponds to the metrics groups the first version of the metrics sub-model having a first priority (i.e., the highest priority). If the metrics information available for the content item includes metrics information corresponding to the first set of metrics groups, the model selection module 310 selects 725 the first version of the metrics sub-model.

If the metrics information available for the content item does not include metrics information corresponding to every metrics group in the first set of metrics groups, the model selection module 310 determines 730 if the metrics information available for the content item includes at least metrics information corresponding to a second set of metrics groups. The second set of metrics groups corresponds to the metrics groups the second version of the metrics sub-model having a second priority (i.e., the second highest priority). If the metrics information available for the content item includes metrics information corresponding to the second set of metrics groups, the model selection module 310 selects 735 the second version of the metrics sub-model.

This process is repeated until a version of the metrics sub-model has been selected. In some embodiments, if the lowest priority version of the metrics sub-model is selected 755 if the metrics information available for the content item does not satisfy the requirements of any higher priority version. In other embodiments, if the metrics information available for the content item does not satisfy the requirements of any version of the metrics sub-model, the metrics sub-model is not applied for the content item and an indication that there was insufficient metrics information is provided to a system administrator of the taxonomy classification system 250.

After a version of the metrics sub-model is selected, the taxonomy classification system 250 applies 760 the selected version of the metrics sub-model to generate metrics scores for the content item. The metrics sub-model may generate metrics scores $prob_m(label_i)$ for each label $label_i$ in a corresponding label class 150. By training multiple versions of the metrics sub-model and selecting a version based on the metrics information that is available for a content item, the accuracy of the metrics information can be improved. First, the accuracy of the higher priority versions is improved as the training dataset is selected to exclude content items with insufficient amount of information. Moreover, the accuracy of lower priority versions is also improved as prediction of the lower priority versions are tuned to specific subsets of metrics groups. That is, compared to the higher priority versions, the lower priority versions are configured to make a prediction based on specific combinations of groups. As such, the lower priority versions emphasize the metrics information associated with specific metrics groups, whereas the higher priority versions might have de-emphasized the importance of the metrics information contained in those metrics groups in exchange of information associated in other metrics groups that the higher priority versions deemed more relevant to the prediction.

Referring back to FIG. 6, the affinity sub-model receives 630 an indication of content items that are similar to the content item for which the affinity score is being calculated. Based on identification of the similar content item, the affinity sub-model is applied 635 to generate an affinity score. The similar content items may be selected by the content item provider 230, or may be selected by the content item publisher 235. For instance, the content item provider 230 may identify similar content items when providing the content item to the content item publisher 235. In another example, the content item publisher 235 may select using their own algorithm the similar content items based on the information about the content item provided to the content item publisher 235 from the content item provider 230. That is, other content items that a user have a high likelihood of liking if the user liked the content item for which the affinity score is being calculated.

For example, if the content item is a mobile application (such as a mobile game) being distributed through an app store (e.g., Google Play store, or Apple App store), the app store may identify similar mobile application based on information provided by the mobile app developer. In some embodiments, the similar content items are one or more "users may also like" content items. The taxonomy classification system then receives the indication of similar content items from one or more apps stores to apply the affinity sub-model to generate the affinity score.

In some embodiments, the affinity mode is not a trained model. Instead, the affinity model may determine an affinity score for a label based on the labels for each of the similar content items. For example, if the similar content items include n content items, and $m_i$ of the content items have a label i associated with them, the affinity model determines the affinity score $prob_a(label_i)$ for the label i as:

$$prob_a(\text{label}_i) = \frac{m_i}{n} \quad (\#\#)$$

In some embodiments, the NLP score, the metrics score, and the affinity score are probabilities determined by each of the sub-models that a corresponding label applies to the content item. In some embodiment, the NLP sub-model determines NLP scores for each of the labels in a label class and the NLP score for each label in a label class add up to a predetermined number (e.g., 1). Similarly, the metrics sub-model determines metrics scores for each of the labels in a label class and the metrics score for each label in a label class add up to a predetermined number (e.g., 1). Additionally, the affinity sub-model determines affinity scores for each of the labels in a label class and the affinity score for each label in a label class add up to a predetermined number (e.g., 1). However, the NLP scores are independent from the metrics scores and the affinity scores, the metrics scores are independent from the NLP scores and the affinity scores, and the affinity scores are independent from the NLP scores and the metrics scores.

Based on the NLP score, the metrics score, and the affinity score, a hybrid sub-model is applied 650 to generate a label score for one or more taxonomy labels. The hybrid model combines the NLP score, the metrics score, and the affinity score to generate the label score for the one or more taxonomy labels. In some embodiments, the hybrid model determines a weighted average of the NLP score, the metrics score, and the affinity score. The weights for each of the score is determined by training the hybrid model using a training set that includes pre-labeled content items. That is, for each label $label_i$ in a label class 150, the hybrid model determines a label score prob ($label_i$) as:

$$prob(\text{label}_i) = w_{NLP} \cdot prob_{NLP}(\text{label}_i) + w_m \cdot prob_m(\text{label}_i) + w_a \cdot prob_a(\text{label}_i) \quad (\#\#)$$

where $w_{NLP}$ is a weight for the NLP score, $w_m$ is a weight for the metrics score, and $w_a$ is a weight for the affinity score.

Figure 8A:
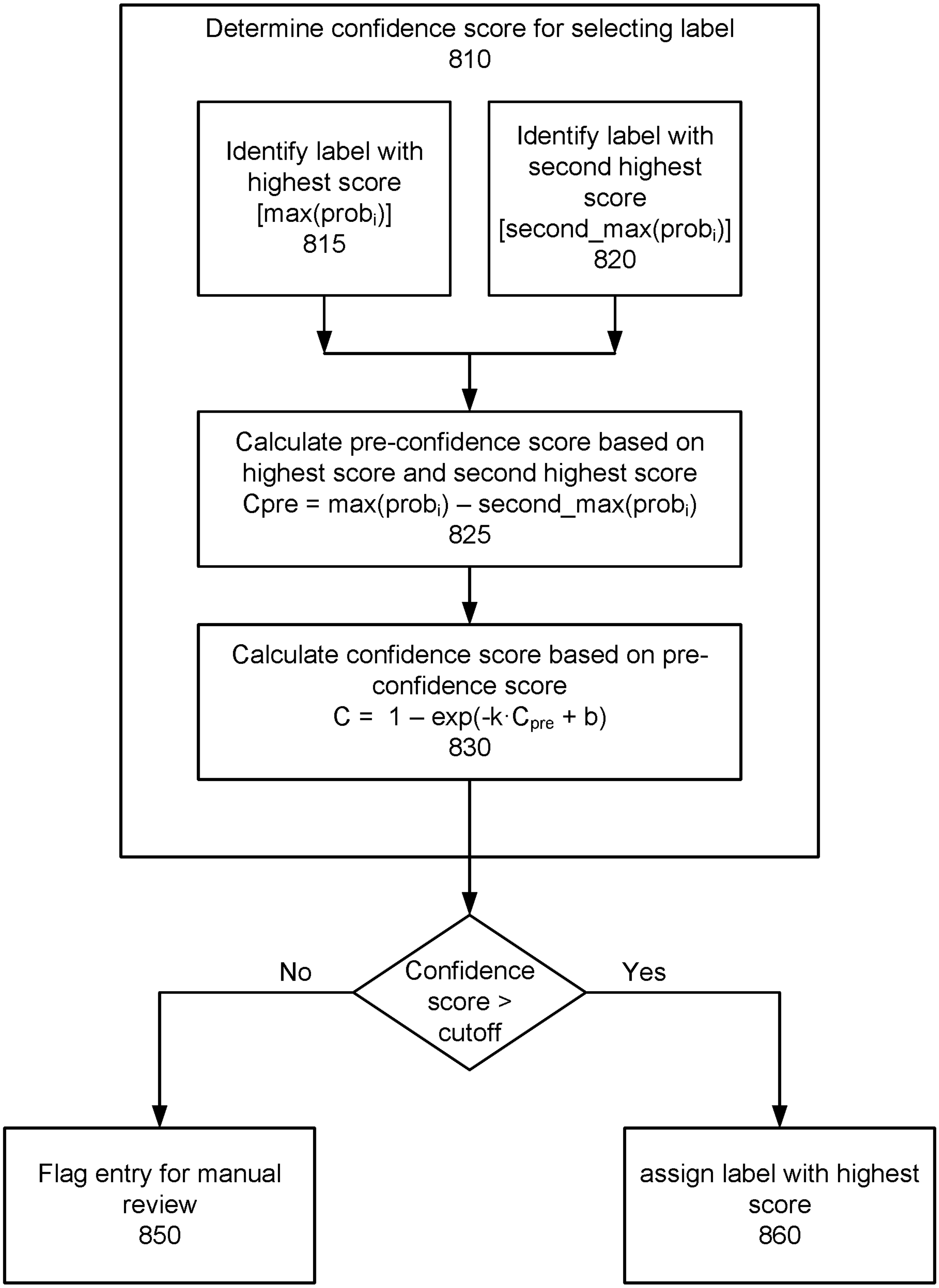
FIG. 8A illustrates a flow diagram for assigning a taxonomy label to a content item, according to one embodiment.

FIG. 8A illustrates a flow diagram for assigning or associating a taxonomy label to a content item, according to one embodiment. The label selection module 315 receives label scores for each of the labels in a specific level of a taxonomy branch. The label selection module 315 identifies 815 a label with a highest label score, and identifies 820 a label with a second highest label score. That is, for each label; having a label score of $prob_i$, the label selection module 315 identifies the highest scored label $label_{1st}$ having a label score of:

$$\max(prob_i) i = 0, 1, \ldots n \quad (\#\#)$$

Where $prob_i$ is the label score of the i-th label in a class of labels 150, and n is the number of labels in the class of labels 150. The second highest scored label $label_{2nd}$ having a label score of:

$$\text{second\_max}(prob_i);\ i=0,1,\ldots\ n \qquad (\#\#)$$

The label selection module 315 determines 825 a pre-confidence score $C_{pre}$ based on the highest label score max ($prob_i$) and the second highest label score second_max ($prob_i$). In some embodiments, the pre-confidence score $C_{pre}$ is equal to:

$$C_{pre}=\max(prob_i)-\text{second\_max}(prob_i) \qquad (\#\#)$$

The label selection module 315 determines 830 a confidence score C based on the pre-confidence score. In some embodiments, the confidence score C is equal to:

$$C=1-e^{-k\cdot C_{pre}+b} \qquad (\#\#)$$

Where k and b are parameters fitted to a probability curve using a training data set. In some embodiments, k and b are fitted based on a curve generated based on a number of times a pre-confidence score resulted in a misclassification. That is, based on a number of times the highest label scored labeled was not the label selected by a manual reviewer.

Figure 8B:
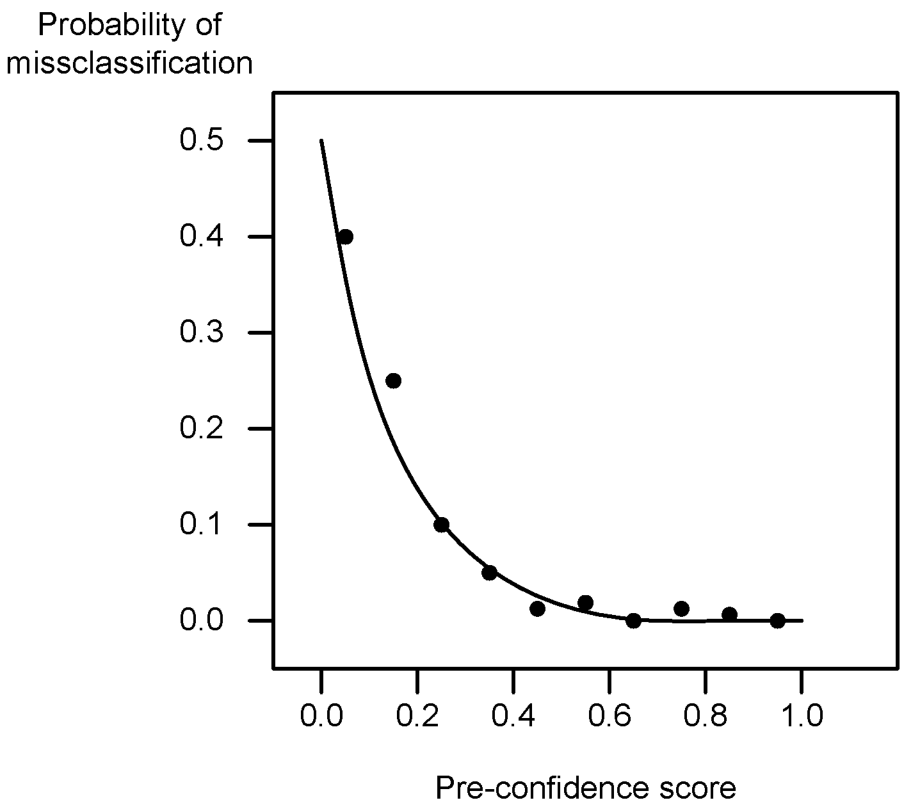
FIG. 8B illustrates a fitting curve for determining estimated parameters k and b for determining the confidence score C, according to one embodiment.

FIG. 8B illustrates a fitting curve for determining estimated parameters k and b for determining the confidence score C, according to one embodiment. The fitting curve shows a plot of a probability of a content item being misclassified versus the pre-confidence score of the content item. In some embodiments, the probability of a content item being misclassified for a given pre-confidence score or pre-confidence score range is determined as a ratio between content items that would have been misclassified by the taxonomy classification system to a total number of content item in a training dataset. The training module 380 then fits an exponential curve and the estimated parameters are determined from an equation of the fitted curve.

The label selection module 315 makes a determination of whether the confidence score C is greater than a threshold value $C_{th}$. If the confidence score C is greater than the threshold value $C_{th}$, the label selection module 315 assigns 860 the label with the highest label score. Otherwise, if the confidence score C is not greater than the threshold value $C_{th}$, the content item is flagged 850 for manual review.

Modifier Tags—Visual Tagging Algorithm

Figure 9:
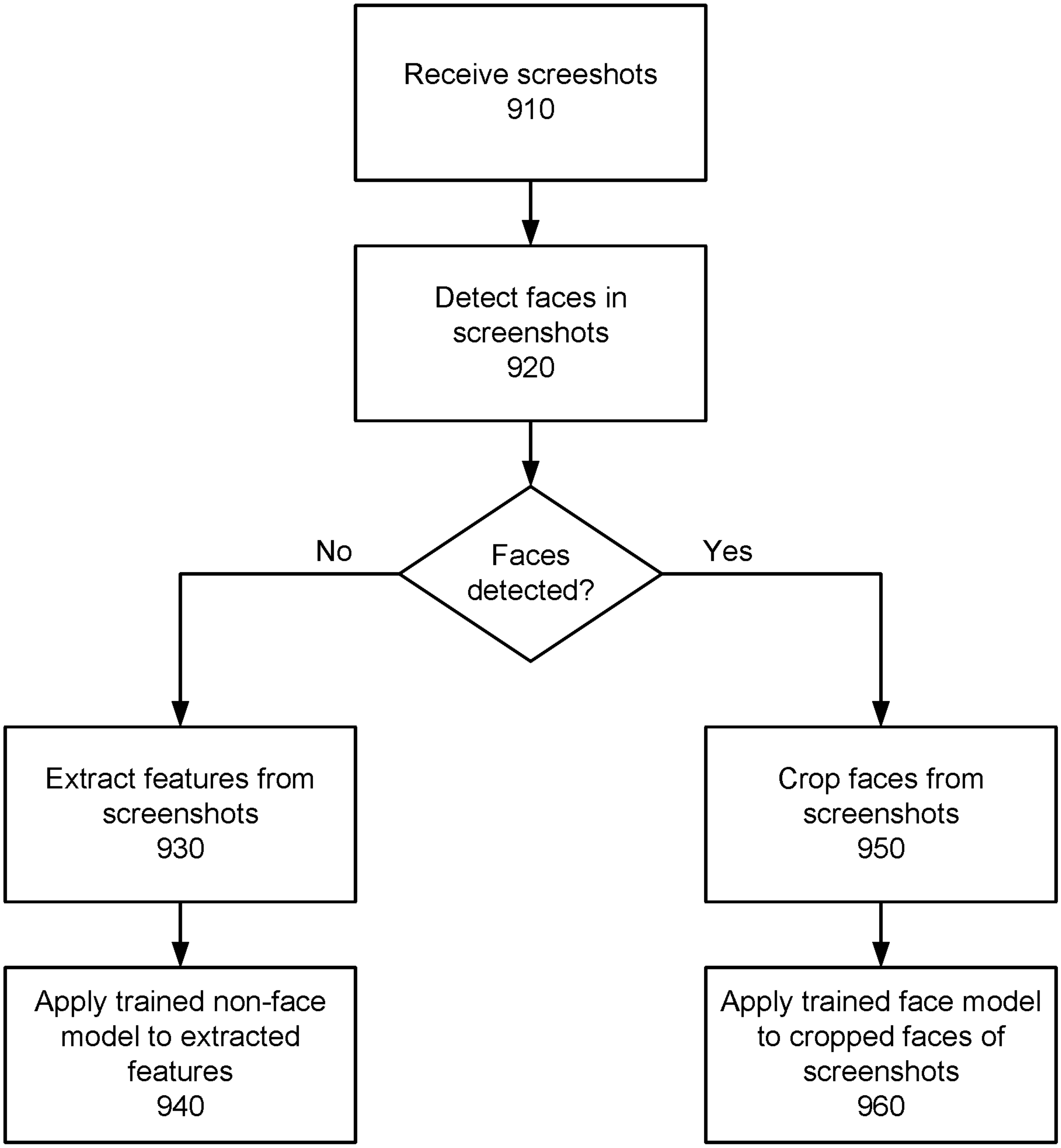
FIG. 9 illustrates a flow diagram for selecting a visual tag for a content item, according to one embodiment.

FIG. 9 illustrates a flow diagram for selecting a visual tag for a content item, according to one embodiment. The visual tag module 350 receives 910 screenshots of the content items. For example, if the content item is a mobile application, the visual tag module 350 receives screenshots of several user interfaces of the content item. If the content item is a mobile game, the visual tag module 350 receives screenshots of gameplay. The visual tag module detects 920 faces in the received screenshots. If faces are detected in the received screenshots, the screenshots are cropped 950 around the detected faces. The visual tag module 350 then applies a trained classification model (face model) to identify an art style of the content item based on characteristics of the detected faces. In some embodiments, the face model is applied to each of the cropped faces from each of the received screenshots and a visual tag is selected based on a majority vote of art styles. That is, the visual tag module identifies the visual tag with the highest number of occurrences from the visual tags assigned to each of the cropped faces and assigns the identified visual tag with the highest number of occurrences to the content item.

If faces are not detected in the received screenshots, features are extracted 930 from the receives screenshots and a non-face model is applied 940 on the extracted features. The non-face model uses high level features such as color related features (e.g., number of different colors in the screenshots, saturation average of the screenshots, number of highly saturated pixels in the screenshots, frequency of colors used in the screenshots, etc.) and space correlation related features (e.g., spatial gray-level dependence, farthest neighbor, color correlogram, gray histogram, etc.). In some embodiments, the non-face model is a logistics regression model trained using screenshots that don't include faces for content items in a training dataset.

Modifier Tags—Monetization and Gameplay Tagging Algorithm

The monetization tag module 360 includes multiple monetization models for determining whether to associate a monetization tag to the content item. The gameplay tag module 365 includes multiple gameplay models for determining whether to associate a gameplay tag to the content item. Each monetization or gameplay model is configured to detect a different set of key-strings and determines whether to assign a monetization or gameplay tag to a content item based on the detection of the specific key-strings in a description of the content item. For example, a monetization model the determines whether to assign a consumables tag to a content item identifies whether the key-strings "diamond," "runes," or "chips" are includes in the description of the content item and increases the modifier score for the consumables tag if the key-strings are detected. Moreover, a monetization or gameplay model may additionally decrease the modifier score for a particular tag if certain key-antistrings are identified in the description of the content item. For example, a monetization model that determines whether an advertisement tag should be assigned to a content item decreases the modifier score for the advertisement tag if the key-antistring "no 3rd-party ad" is identified in the description of the content item.

Each monetization and gameplay model are trained to identify a different set of key-strings and key-antistrings and generate a modifier score based on their respective sets of key-strings and key-antistrings. In some embodiments, if both key-strings and key-antistrings for a specific tag are identified in the description, the model determines a modifier score based on the number of occurrences of the key-strings and the key-antistrings. In other embodiments, if a key-antistring for a specific tag is identified in the description of a content item, the specific tag is not associated with content item. Moreover, in this embodiment, the specific tag is only associated with the content item if a key-string is identified in the description of the content item and a key-antistring is not identified in the description of the content item. That is, in this embodiment, if both key-strings and key-antistrings are included in the description of the content item, the specific tag is not associated with the content item.

Figure 10A:
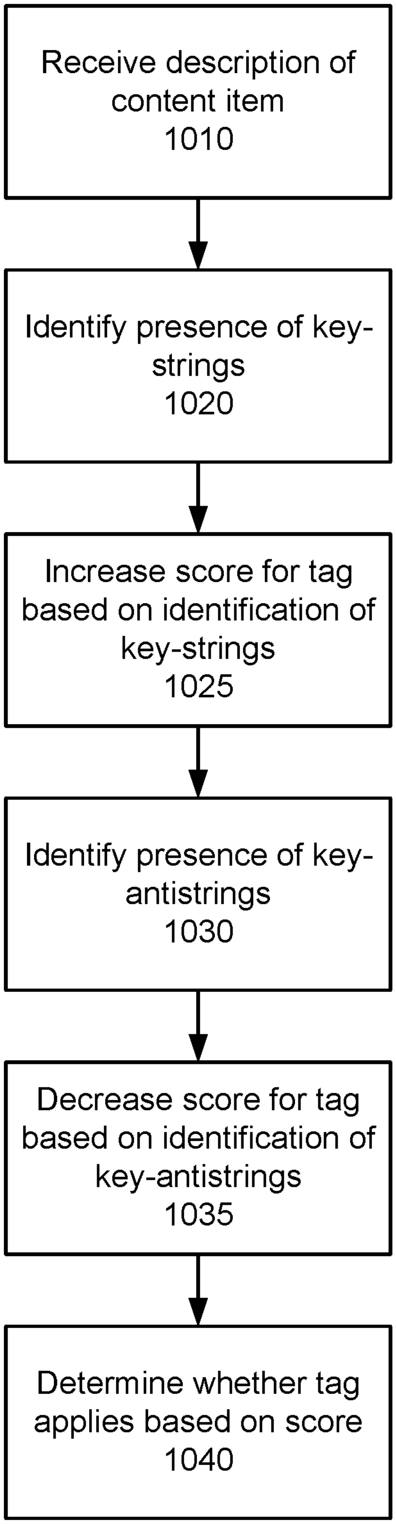
FIG. 10A illustrates a flow diagram for selecting a monetization or a gameplay tag for a content item, according to one embodiment.

FIG. 10A illustrates a flow diagram for selecting a monetization or a gameplay tag for a content item, according to one embodiment. The monetization tag module receives

1010 a description of a content item. The monetization tag module identifies 1020 the presence of key-strings. If the description of the content item includes one or more key-strings, the modifier score for a corresponding monetization tag is increased 1025. Moreover, the monetization tag module identifies 1030 the presence of key-antistrings. If the description of the content item includes one or more key-antistrings, the modifier score for a corresponding monetization tag is decreased 1035. Finally, a determination whether the monetization tag applies to the content item is made 1040 based on the modifier score.

Figure 10B:
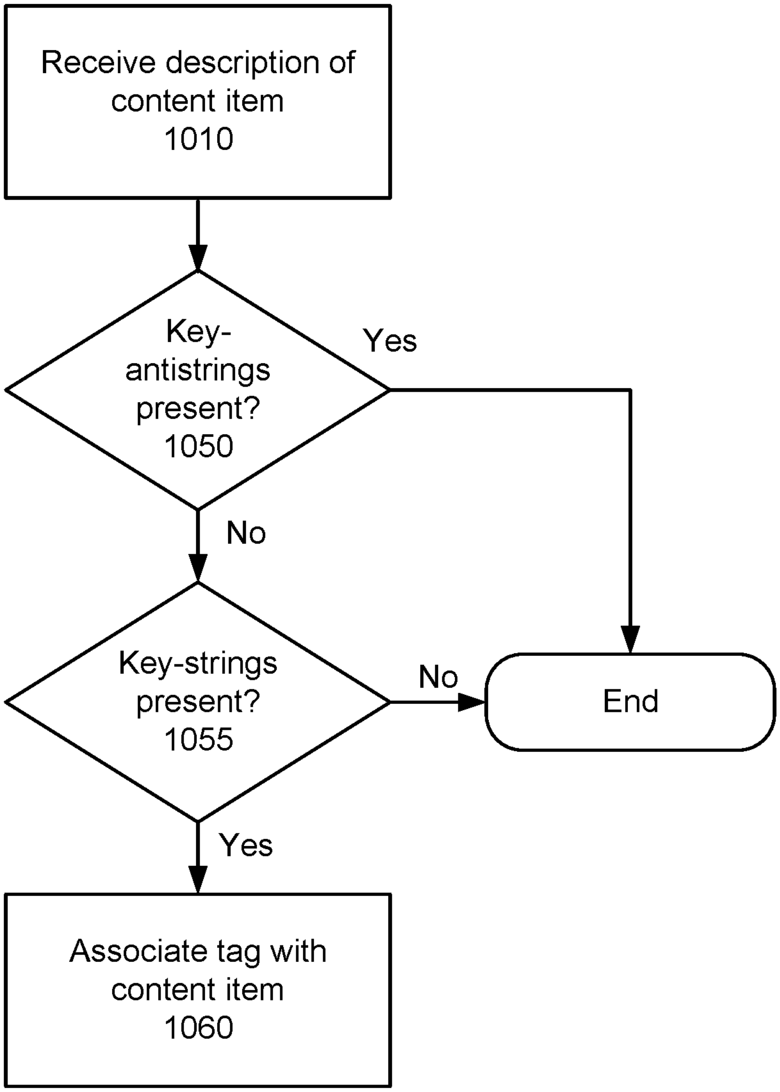
FIG. 10B illustrates a flow diagram for selecting a monetization or a gameplay tag for a content item, according to another embodiment.

FIG. 10B illustrates a flow diagram for selecting a monetization or a gameplay tag for a content item, according to another embodiment. The monetization tag module receives 1010 a description of a content item. The monetization tag module determines 1050 if one or more key-antistrings are present in the description of the content item. If a key-antistring is present in the description of the content item, the monetization tag is not assigned to the content item. Conversely, if the description of the content item does not include any key-antistrings, the monetization tag module determines 1055 if one or more key-strings are present in the description of the content item. If one or more key-strings are present in the description of the content item, the monetization tag module associates 1060 the monetization tag to the content item.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for classifying a mobile device application, the method comprising:

assigning one or more taxonomy labels to the mobile device application, comprising:

selecting a taxonomy label using a first trained model, comprising:

applying a first sub-model of the first trained model based on a description of the mobile device application;

applying a second sub-model of the first trained model based on metrics information for the mobile device application from one or more mobile device application publishers, wherein applying the second sub-model based on metrics information comprises:

identifying categories of metrics information that are available for the mobile device application;

selecting a single version of the second sub-model based on the categories of metrics information that are available for the mobile device application, the single version of the second sub-model selected from a plurality of versions of the second sub-model, each version of the plurality of versions of the second sub-model trained using metrics information corresponding to different combinations of categories of metrics information, wherein selecting the version of the second sub-model comprises: determining a set of feature categories on which each of the plurality of versions of the second sub-model were trained, and selecting the single version of the plurality of versions based on a priority of a match of the available categories of metrics information of the mobile device application to the sets of feature categories used to train each of the versions of the second sub-model and based on whether all categories for the version of the second sub-model are in the set of available categories for the mobile device application, the priority indicating a relative quantity of matching categories between the version of the second sub-model and the mobile device application relative to quantities for the plurality of versions of the second sub-model; and applying the selected single version of the second sub-model to generate metrics scores for one or more labels in a label class;

applying a third sub-model of the first trained model based on a list of content items having one or more characteristics that are also had by the mobile device application;

combining an output of the first sub-model, an output of the second sub-model, and an output of the third sub-model to generate label scores for one or more labels in a label class; and selecting the taxonomy label from the label class based on the generated label scores.

2. The method of claim 1, further comprising:

assigning one or more tags to the mobile device application, comprising for each tag of a plurality of tags:

applying a corresponding model to determine a likelihood that a tag applies to the mobile device application; and responsive to determining that the likelihood that the tag applies to the mobile device application is above a threshold value, assigning the tag to the mobile device application.

3. The method of claim 1, wherein a taxonomy of the one or more taxonomy labels has multiple levels, wherein the selected taxonomy label is a first-level taxonomy label corresponding to a first level of the taxonomy, and wherein assigning the one or more taxonomy labels to the mobile device application further comprises:

selecting a second-level model from a plurality of second-level models, the second-level model selected based on the selected first-level taxonomy label; and selecting a second-level taxonomy label corresponding to a second level of the taxonomy, the second-level taxonomy label from a set of second-level taxonomy labels associated with the selected first-level taxonomy label, the second-level taxonomy label selected using the selected second-level model.

4. The method of claim 3, wherein selecting the second-level model from the plurality of second-level models comprises:

selecting the second-level model corresponding to the selected first-level taxonomy label, each second level-model from the plurality of second-level models corresponding to a different taxonomy label in the first level of the taxonomy.

5. The method of claim 1, wherein selecting the version of the second sub-model comprises:

filtering the plurality of versions of the second sub-model based on the categories of metrics information that are available for the mobile device application; and selecting the version of the second sub-model with a highest priority.

6. The method of claim 1, wherein assigning the one or more taxonomy labels to the mobile device application further comprises:

determining a confidence score for the taxonomy label; and assigning the selected taxonomy label to the mobile device application responsive to the confidence score being above a threshold value.

7. The method of claim 6, wherein determining the confidence score for the taxonomy label comprises:

generating a selection score for each taxonomy label in a label class;

identifying a highest selection score from the generated selection scores of each taxonomy label in the label class;

identifying a second highest selection score from the generated selection scores of each taxonomy label in the label class;

determining a pre-confidence score based on a difference between the highest selection score and the second highest selection score; and determining the confidence score based on the pre-confidence score, the confidence score determined using estimated parameters calculated by fitting a probability curve to a training dataset.

8. The method of claim 7, wherein the estimated parameters are calculated by fitting an exponential curve to the training dataset.

9. The method of claim 7, wherein assigning the selected taxonomy label to the mobile device application responsive to the confidence score being above the threshold value comprises:

responsive to the confidence score being above the threshold value, assigning a taxonomy label with the highest selection score to the mobile device application.

10. The method of claim 6, further comprising:

responsive to the confidence score being below the threshold value, sending the mobile device application for manual classification.

11. A method for applying a trained model to a mobile device application, comprising:

identifying a set of available feature categories for the mobile device application;

selecting a single version of the trained model based on the identified set of available feature categories for the mobile device application, the single version of the trained model selected from a plurality of versions of the trained model, each version in the plurality of versions of the trained model trained using a different set of feature categories of content items in a training dataset, wherein selecting the version of the trained model comprises:

determining a set of feature categories on which each of the plurality of versions of the trained model were trained; and selecting the single version of the plurality of versions based on a priority of a match of the available feature categories of the mobile device application to the sets of feature categories used to train each of the versions of the trained model and based on whether all feature categories for the version of the trained model are in the set of available feature categories for the mobile device application, the priority indicating a relative quantity of matching feature categories between the version of the trained model and the mobile device application relative to quantities for the plurality of versions of the trained model; and applying the selected single version of the trained model.

12. The method of claim 11, wherein selecting the version of the trained model further comprises:

responsive to determining that the available features for the mobile device application includes every feature category used to train a first version of the trained model, selecting the first version of the trained model.

13. The method of claim 11, wherein the selected version of the trained model is trained using more feature categories than a second version of the trained model, and wherein the selected version of the trained model is more accurate than the second version of the trained model.

14. The method of claim 11, wherein selecting the single version of the plurality of versions based on the priority of the match of the available features of the mobile device application to the sets of feature categories used to train each of the versions of the trained model includes:

determining whether the set of available features for the mobile device application includes every feature category used to train a first version of the trained model; and responsive to determining that the available features for the mobile device application do not include every feature category used to train the first version of the trained model:

determining that the set of available features for the mobile device application includes every feature category used to train one or more other versions of the trained model, the one or more other versions of the trained model having lower priority levels than the first version of the trained model; and selecting a second version of the trained model, as opposed to the first version of the trained model, to be the selected version of the trained model, the second version being selected from among the one or more other versions based on the second version having a highest priority from among the one or more other versions.

* * * * *